(12) United States Patent
De Muelenaere et al.

(10) Patent No.: US 8,463,054 B2
(45) Date of Patent: Jun. 11, 2013

(54) HIERARCHICAL OCR USING DECISION TREE AND NONPARAMETRIC CLASSIFIER

(75) Inventors: Pierre De Muelenaere, Court-Saint-Etienne (BE); Michel Dauw, Machelen (BE); Olivier Dupont, Sombreffe (BE); Patrick Verleysen, Wavre (BE)

(73) Assignee: I.R.I.S., Mont-Saint-Guibert (BE)

( * ) Notice: Subject to any disclaimer, the term of this patent is extended or adjusted under 35 U.S.C. 154(b) by 0 days.

(21) Appl. No.: 13/442,192

(22) Filed: Apr. 9, 2012

(65) Prior Publication Data

US 2013/0039591 A1 Feb. 14, 2013

Related U.S. Application Data

(63) Continuation of application No. 13/427,063, filed on Mar. 22, 2012, now abandoned.

(60) Provisional application No. 61/522,274, filed on Aug. 11, 2011.

(51) Int. Cl.
*G06K 9/00* (2006.01)

(52) U.S. Cl.
USPC .......................... 382/227; 382/257; 382/308

(58) Field of Classification Search
None
See application file for complete search history.

(56) References Cited

U.S. PATENT DOCUMENTS

| | | | | |
|---|---|---|---|---|
| 3,634,822 A | * | 1/1972 | Chow | 382/228 |
| 4,010,446 A | * | 3/1977 | Kawa | 382/258 |
| 4,499,596 A | * | 2/1985 | Casey et al. | 382/159 |
| 4,831,657 A | * | 5/1989 | Casey et al. | 382/228 |
| 4,989,258 A | * | 1/1991 | Takahashi et al. | 382/226 |
| 5,394,484 A | * | 2/1995 | Casey et al. | 382/159 |
| 5,745,600 A | * | 4/1998 | Chen et al. | 382/218 |
| 5,778,092 A | * | 7/1998 | MacLeod et al. | 382/176 |
| 6,269,353 B1 | * | 7/2001 | Sethi et al. | 706/20 |
| 7,031,948 B2 | * | 4/2006 | Lee | 706/14 |
| 2008/0273807 A1 | * | 11/2008 | Dauw et al. | 382/237 |

OTHER PUBLICATIONS

Wang et al. (Aug. 1995) "A multi-layer classifier for recognition of unconstrained handwritten numerals." Proc. 3rd IEEE Int'l Conf. on Document Analysis and Recognition, vol. 2 pp. 849-852.*
Xu et al. (Jul. 2009) "A hierarchical classification model for document categorization." Proc. 10th IEEE Int'l Conf. on Document Analysis and Recognition, pp. 486-490.*
Safavian et al. (Jun. 1991) "A survey of decision tree classifier methodology." IEEE Trans. on Systems, Man, and Cybernetics, vol. 21 No. 3, pp. 660-674.*
Blue et al. (Oct. 1993) "Evaluation of pattern classifiers for fingerprint and OCR applications." Pattern Recognition, vol. 27 No. 4, pp. 485-501.*
Ripley, B.D. (1996) Pattern Recognition and Neural Networks. Cambridge University Press.*
Serra et al., Eds. (1994) Mathematical morphology and its applications to image processing. Kluwer Academic Publishers.*

* cited by examiner

*Primary Examiner* — Barry Drennan
(74) *Attorney, Agent, or Firm* — Jerold I. Schneider (57) ABSTRACT

A pattern recognition process, a non-transitory computer program product, and a mobile terminal for pattern recognition. An input pattern is normalized and a reliable pattern is generated from the normalized pattern by using at least one morphological operator. The distance between the reliable pattern and selected templates which are selected from a template library using a decision tree, is calculated. The reliable patterns are classified into at least one of the classes of the selected templates by at least one non-parametric classification method.

22 Claims, 11 Drawing Sheets

HIERARCHICAL OCR USING DECISION TREE AND NONPARAMETRIC CLASSIFIER

CROSS-REFERENCE TO RELATED APPLICATION

This application is a utility application and claims priority from U.S. Provisional Application No. 61/522,274 filed Aug. 11, 2011, the entirety of which is hereby incorporated by reference.

TECHNICAL FIELD

The present invention relates to a pattern recognition process. The present invention further relates to a computer program product for carrying out said pattern recognition process and a mobile terminal provided with said pattern recognition process in a format executable on the mobile terminal.

BACKGROUND ART

Optical Character Recognition (OCR) systems are known in the art. They convert the image of printed text into machine-readable code by using a character recognition process. In an OCR system, the images of what could be characters are isolated and a character recognition process is used to identify the character.

Figure 1:
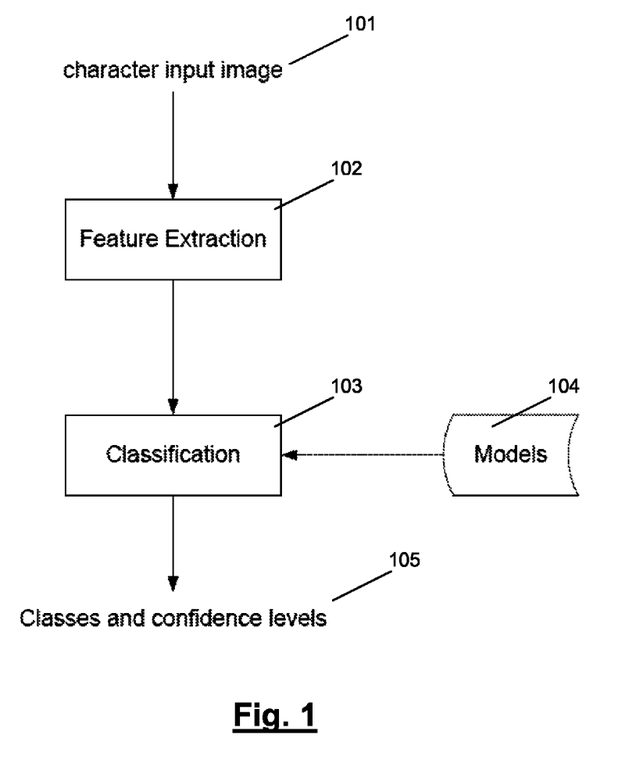
FIG. 1 shows a flowchart of a prior art feature-based character recognition process.

A character recognition process, such as the one shown in FIG. 1, comprises generally:

(a) A feature extraction process 102 that extracts a feature vector from the character input image 101.

(b) A classification process 103 that compares the feature vector with models 104 and assigns the feature vector to a class of a given set of classes, which is the output 105.

In state of the art OCR systems, the classification process needs not only to output one class but also alternative classes and confidence levels. The OCR system comprises then a contextual decision system that will use that information along with linguistic or typographic contextual information to output the best recognition text.

The set of features that are calculated describes the shapes of the characters to recognize. They should be discriminant, insensible to character deformation and additional noises and give reliable confidence levels.

On the other hand, some character recognition processes are based on template matching but those character recognition processes can only recognize text written in a limited number of fonts. However, the confidence levels given by those character recognition processes are normally more reliable than feature-based character recognition systems.

DISCLOSURE OF THE INVENTION

It is an aim of this invention to provide a pattern recognition process which provides reliable confidence levels without being restricted to a limited number of fonts.

It is another aim of this invention to provide a pattern recognition process which is small and fast enough to be embedded into a digital copier or used in a mobile terminal such as a Smartphone or tablet PC.

It is another aim of this invention to provide a computer program product for carrying out said pattern recognition process and a mobile terminal provided with said pattern recognition process in a format executable on the mobile terminal.

These aims are achieved according to the invention as described in the independent claims.

As used herein, with "pattern recognition" is intended to mean any form of recognition of a digital pattern or image, such as for example characters or character combinations, graphic elements, sounds (e.g. in voice recognition), or other, by means of any kind of computer device. It is to be noted that when used for characters the recognition system of this invention is not limited to recognize one character but may also recognize multiple characters like ligatures (e.g. fl, ffl) or other touching characters (e.g. rn, vv), parts of a character such as an accent (e.g. acute accent in é) or even other graphical symbols. This invention can also have provisions to recognize characters crossed by an underline or another graphical element.

As used herein, with "template" is intended to mean the combination of at least one bitmap containing at least reliable bits of a recognized pattern and a class to which the template belongs. For example, a template for lowercase "a" may contain a bitmap of the reliable bits of the character "a" in a given font, possibly bitmaps for normal and bold versions, and a code or identifier representing the class of the character "a". So the templates for lowercase "a" in different fonts contain different bitmaps, as the character shape differs from one font to another, but belong to the same class.

In a first aspect, the present invention provides a pattern recognition process that comprises, starting from an input pattern:

a) normalization of the input pattern into a normalized pattern of predetermined size;

b) generation of a reliable pattern from the normalized pattern by using at least one morphological operator;

c) calculation of a distance between the reliable pattern and selected templates which are selected from a template library, wherein each template belongs to a class;

d) classification of the reliable pattern into at least one of the classes of the selected templates by means of at least one non-parametric classification method, which uses said classes of the selected templates and said calculated distances as inputs and outputs identified classes along with confidence levels.

It has been found that by a combination of these steps, a pattern recognition process may be achieved which provides reliable confidence levels without being restricted to a limited number of fonts. In particular, firstly the reliability of the pattern to be recognized is enhanced by normalisation and the morphological operator. Further, the calculated distances between the reliable patterns and the templates are transformed into class confidence levels by the non-parametric classification method. As the classification still outputs confidence levels, these can be taken into account in subsequent steps to decide between e.g. one character combination or another on the basis of e.g. a contextual analysis (dictionary lookup, comparing character sizes, etc.).

In embodiments according to the invention, the normalization may comprise, for example for characters, a normalization of an input character image into a bitmap which may have a width and height selected between predefined height and width. The normalization process may increase also the thickness of the character strokes for thin strokes and decreases the thickness for thick strokes.

In embodiments according to the invention, the generation of reliable patterns from the normalized pattern by using one or more morphological operators may for example comprise using the dilate or erode operators. Mathematical morphology is a theory and technique for the analysis and processing of geometrical structures. The basic idea in binary morphology is to probe an image with a simple, pre-defined shape, drawing conclusions on how this shape fits or misses the shapes in the image. This simple "probe" is called structuring element, and is itself a binary image. Further information can be found in Serra, J. et al, "Mathematical morphology and its applications to image processing", Kluwer Academic Publishers, 1994, which is incorporated herein by reference in its entirety.

In embodiments according to the invention, the calculation of a distance (which is a measure for the mutual difference) between the reliable patterns and selected templates may be performed by means of a decision tree. In the case of characters, the distance can for example be the number of pixels which are different, but other distances are possible.

Instead of calculating the distances of the reliable patterns to each of the pattern templates as is done in the prior art, the present invention describes embodiments with a decision tree that can accelerate this calculation without loss of accuracy.

In embodiments according to the invention, the classification of the reliable patterns by using one or more non-parametric classification methods may for example comprise one of the following non-parametric classification methods: K-nearest Neighbor (KNN), Parzen windows, Probabilistic Neural Network, radial basis function (RBF).

The use of non-parametric classification methods for pattern recognition has the advantage that it is assumed that the forms of the underlying density function are not known. The density functions p (x/wl) can be estimated from sample patterns (e.g. Parzen windows-Probabilistic Neural Network). Other methods can be used that estimate the posterior probabilities directly (K-nearest Neighbor). Further information can be found in Ripley, B. D., "Pattern Recognition and Neural Networks", Cambridge University Press, 1996, ISBN 0 521 46086 7, which is incorporated herein by reference in its entirety.

In other aspects, the invention relates to a computer program comprising software code fragments for executing the method steps described herein, stored on a storage medium and provided for being loaded into a computer device memory for execution; or a computer device carrying such a computer program, such as for example a mobile terminal or a digital copier; or a computer device carrying a computer program for performing certain steps described herein and provided for communicating with an external server which is provided for performing other steps described herein.

BRIEF DESCRIPTION OF THE DRAWINGS

The invention will be further elucidated by means of the following description and the appended drawings.

MODES FOR CARRYING OUT THE INVENTION

The present invention will be described with respect to particular embodiments and with reference to certain drawings but the invention is not limited thereto but only by the claims. The drawings described are only schematic and are non-limiting.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

Figure 2:
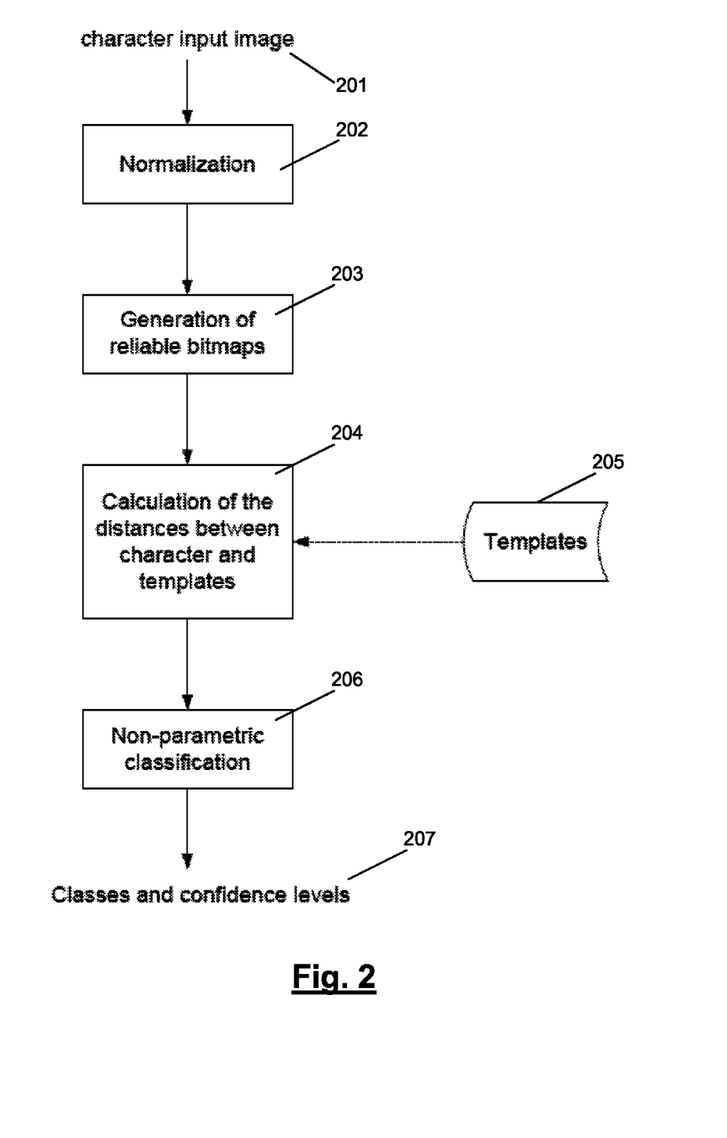
FIG. 2 shows a flowchart of an embodiment of a character recognition process according to the invention.

An embodiment of a character recognition process according to the invention, shown in FIG. 2, comprises the following steps, starting from a character input image 201:

(a) normalization 202 of the character into a bitmap having a width and height selected between predefined height and width. This normalization process may increase also the thickness of the character strokes for thin strokes and decreases the thickness for thick strokes;

(b) generation of reliable bitmaps 203 from the normalized character bitmap by using morphological operators, such as for example the dilate or erode operators;

(c) calculation of a distance 204 between the reliable bitmaps and selected templates 205;

(d) classification 206 by using one or more non-parametric classification methods, such as for example K-nearest Neighbor (KNN), Parzen windows, Probabilistic Neural Network and radial basis function (RBF), which gives classes and confidence levels as output 207.

In the following, preferred embodiments of these steps will be described in further detail.

Image Normalization

Figure 3:
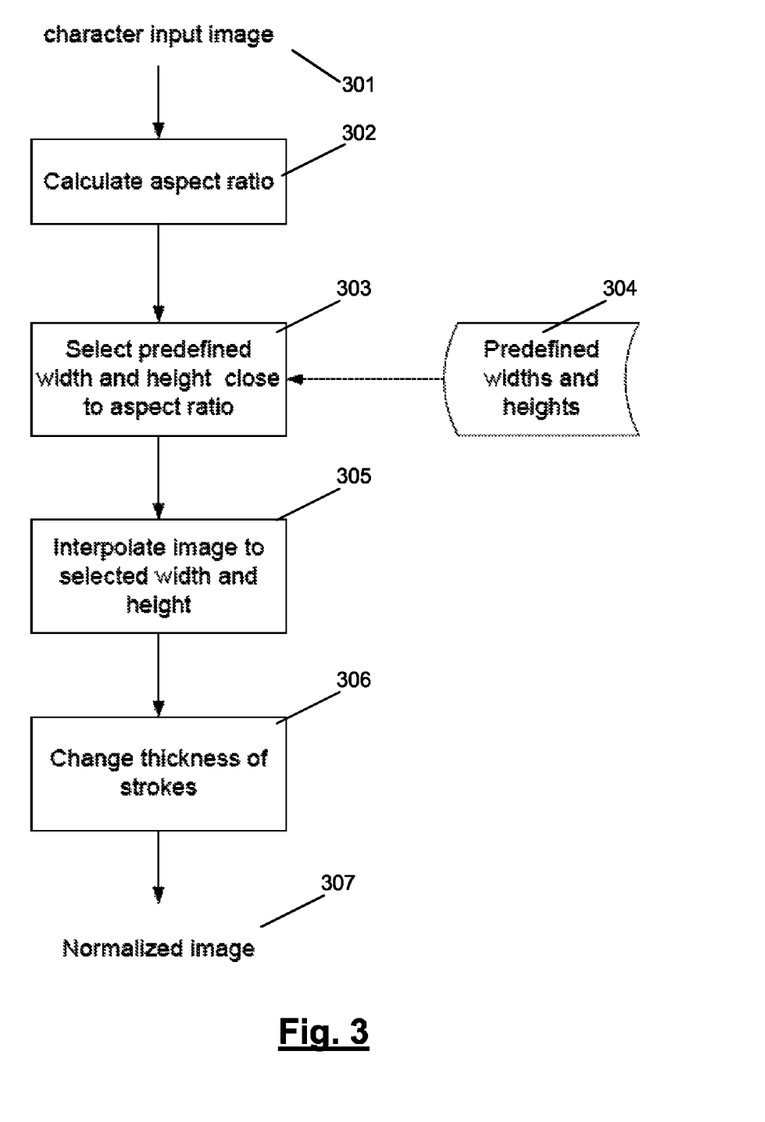
FIG. 3 shows a flowchart of an embodiment of a normalization step of a character recognition process according to the invention.

The normalization process, shown in FIG. 3, transforms the character input image 301 into a bitmap 307 having a fixed width and height. Width and height are selected is step 303 from a list 304 of predefined widths and heights. The selected width and height are the ones that have the nearest aspect ratio to the character aspect ratio, that is calculated in step 302. For example, predefined width and height could be 24×30, 16×30 or 8×30. For the recognition of small symbols like the dot, comma or quote the predefined width and height can be smaller.

The normalization process can thicken the thin strokes, for example strokes of 1 or 2 pixels are thickened to 3 pixels. The normalization process may also thin the thick strokes by thickening for example thin white runs.

Figure 12:
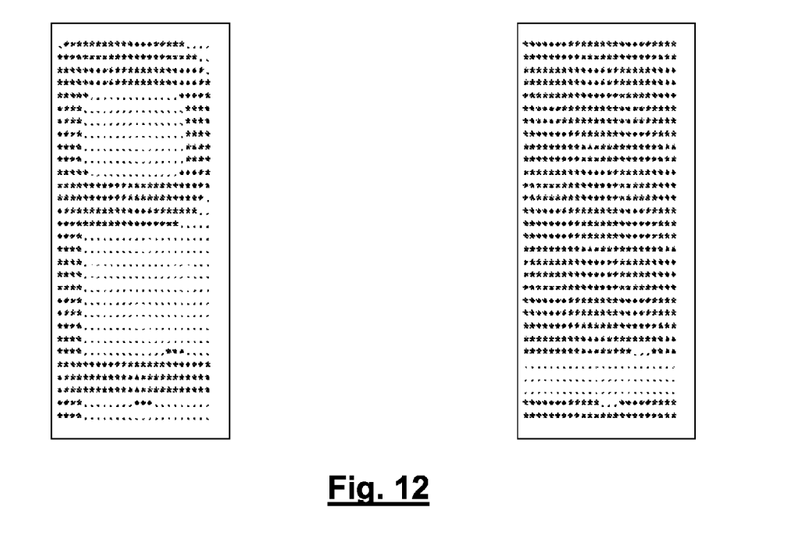
FIG. 12 illustrates a bitmap of an underlined character and the companion bitmap of hidden pixels.

The image of the input character may be binary or grayscale but the normalized image 307 is binary, a pixel having the value 1 for black and 0 for white (or vice versa). The process can also have provision for a companion bitmap called bitmap of hidden pixels having the value 0 for "don't know" and 1 otherwise. This bitmap can be used to process a character crossed by an underline or another graphic element (see example in FIG. 12). In that case, the color of some pixels is not known and the "don't know" value is given.

Generation of Reliable Bitmaps

Figure 8:
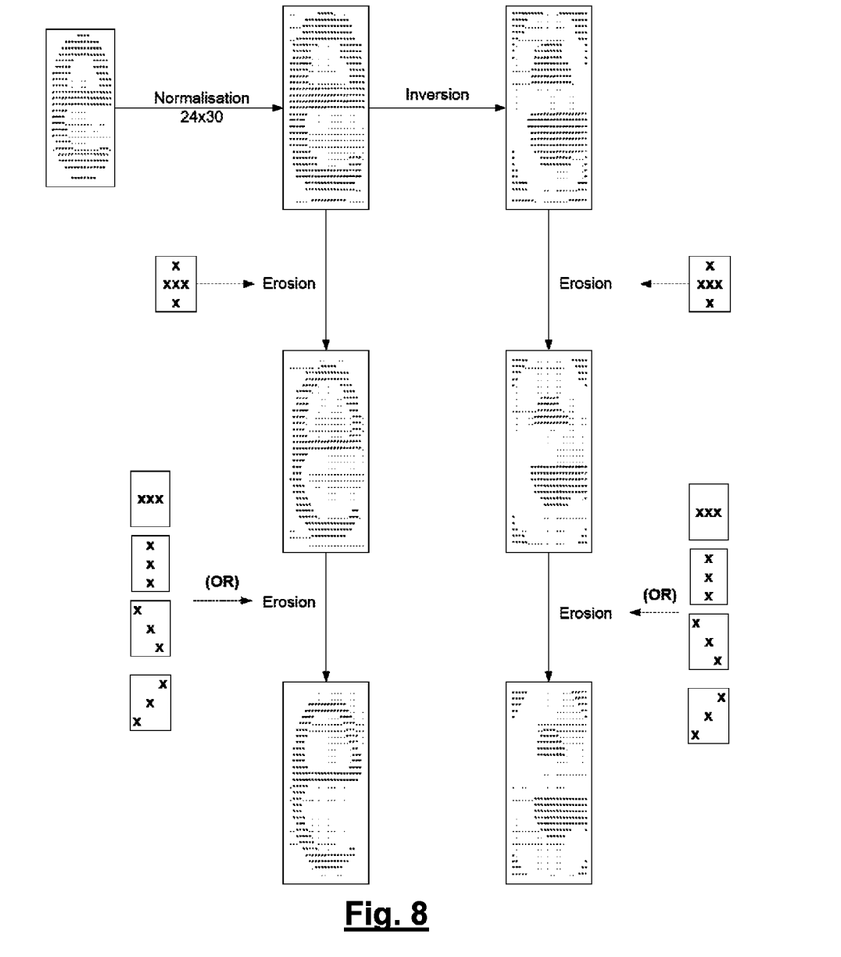
FIG. 8 further illustrates an embodiment of the generation of first and second reliable bitmaps.
Figure 9:
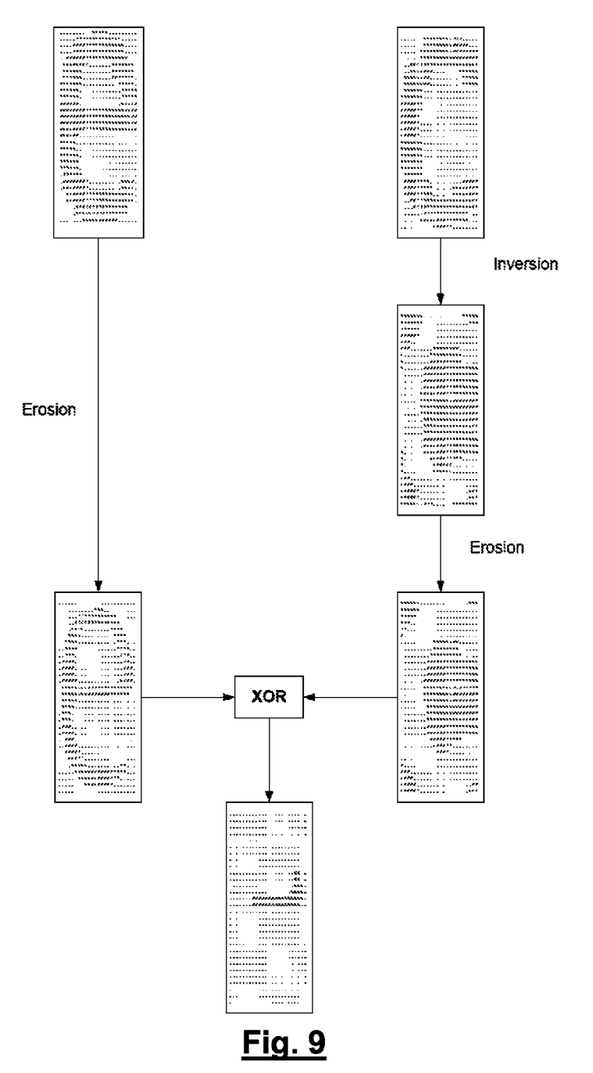
FIG. 9 further illustrates the comparison between a reliable bitmap of black pixels of a character and a reliable bitmap of white pixels of a template.

Pixels surrounded by other pixels of the same color are more reliable than pixels at the edge of the characters. By using the erode morphological operator (see examples in FIGS. 8 and 9), a bitmap with reliable black pixels can be formed and by using the erode morphological operator on the inverted bitmap, a bitmap with reliable white pixels can be formed. The structuring element of the erode operation may for example be a black square 3×3, or a cross with a horizontal line and vertical line having each 3 black pixels.

Figure 4:
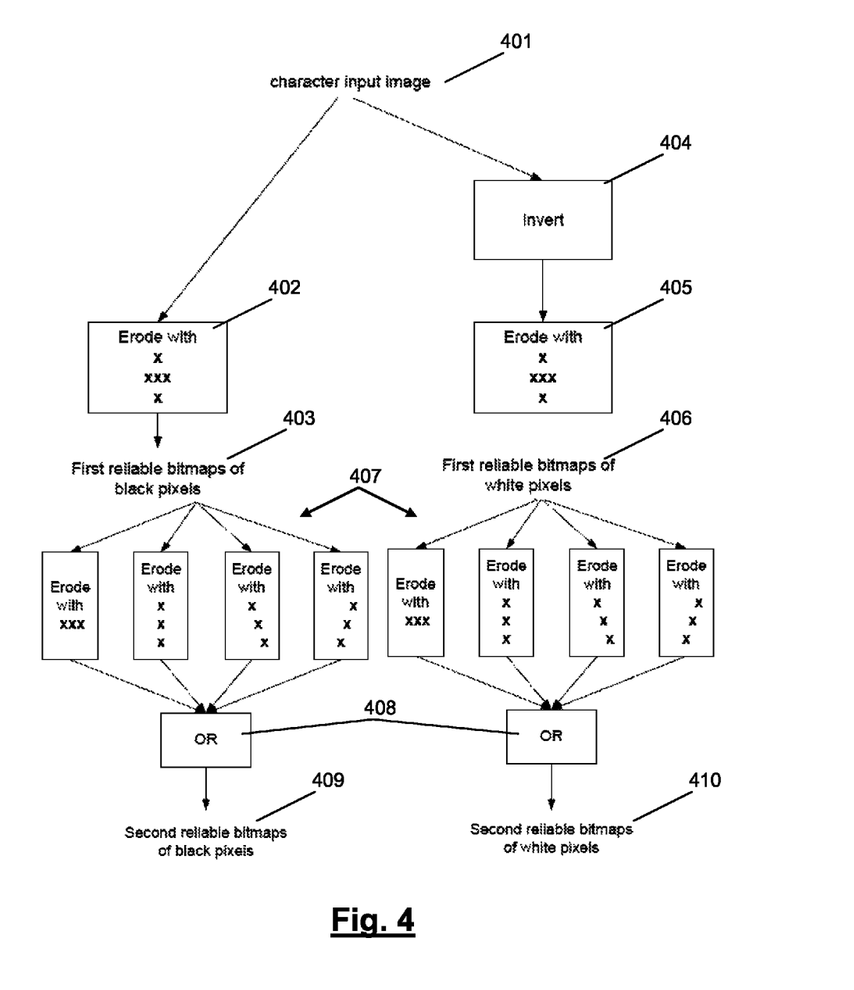
FIG. 4 shows a flowchart of an embodiment of generation of first and second reliable bitmaps of a character recognition process according to the invention.

In one embodiment, shown in FIG. 4, a first set of reliable bitmaps of black and white pixels 403, 406 is generated respectively by erosion 402 of an input character image 401 (which can be the normalized bitmap 307 generated in FIG. 3) and by inversion 404 and erosion 405 of this image 401. An additional second set of reliable bitmaps of black and white pixels 409, 410 are created by eroding the first set of reliable bitmaps by means of subsequent erosion steps 407, followed by an OR step 408.

In this embodiment, 4 structure elements are used for the erosion steps 407: a horizontal line, a vertical line and 2 diagonal lines of 3 black pixels.

It is to be noted that the erosion on a binary image can be performed very quickly by using logical operations on machine octets.

Templates

A template 205 in embodiments of the invention may comprise a predefined number of bitmaps with a predefined width and height and the associated class (e.g. character identification).

In a first embodiment, a template contains the bitmap of a character which has been normalized to a predefined width and height. Reliable bitmaps can be generated during the character recognition process by using the same operations than for the examined character.

In a second embodiment, a template contains pre-calculated reliable bitmaps by using the same operations than for the examined character.

In a third embodiment, the reliable bitmaps contain pre-calculated reliable bitmaps but by aggregating different examples of character bitmaps. This can be done to reduce the number of templates. For example, a normal and bold version of a character can be in the same template.

Distance Calculation Between the Examined Character and a Template.

Figure 5:
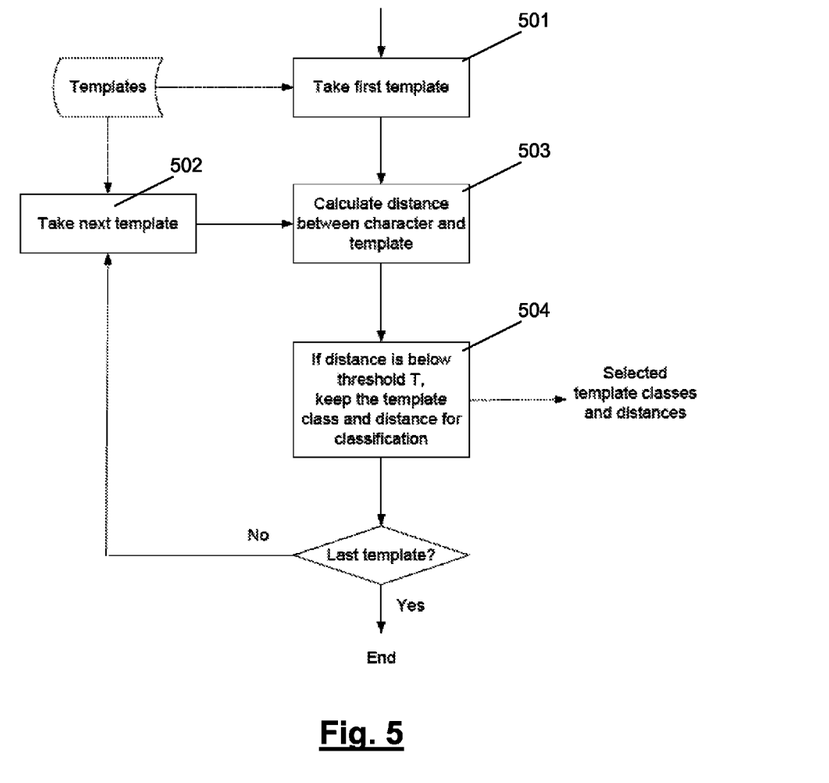
FIG. 5 shows a flowchart of an embodiment of calculation of the distances between an examined character and templates, which may be used in a character recognition process according to the invention.

An embodiment of the distance calculation step 204 is shown in FIG. 5. Templates are selected in steps 501, 502 and XOR operations 503 are performed between reliable bitmaps of the examined character and reliable bitmaps of the template.

In particular, the XOR operations are performed between the reliable bitmaps of black pixels and the reliable bitmaps of white pixels. The number of ON pixels in the result is used to calculate a distance in step 504.

In the preferred embodiment, if:

$A1b$ is the first reliable bitmap of black pixels of the examined character;

$A1w$ is the first reliable bitmap of white pixels of the examined character;

$T1b$ is the first reliable bitmap of black pixels of the template;

$T1w$ is the first reliable bitmap of white pixels of the template;

$A2b$ is the first reliable bitmap of black pixels of the examined character;

$A2w$ is the first reliable bitmap of white pixels of the examined character;

$T2b$ is the first reliable bitmap of black pixels of the template;

$T2w$ is the first reliable bitmap of white pixels of the template;

The following operations are performed in step 503:

$$R1=(A1b \text{ XOR } T1w) \text{ OR } (A1w \text{ XOR } T1b)$$

$$R2=(A2b \text{ XOR } T2w) \text{ OR } (A2w \text{ XOR } T2b)$$

$$\text{Distance}=\#(R1)+4\times\#(R2)$$

with #( ) the function that calculates the number of ON pixels.

In one embodiment, $A1h$ the bitmap of hidden pixels is used and an AND operation is done to calculate $R1'$ and $R2'$ $$R1'=R1 \text{ AND } A1h$$

$$R2'=T2 \text{ AND } A1h$$

$$\text{Distance}=\#(R1')+4\times\#(R2')$$

with #( ) the function that calculates the number of ON pixels.

It is to be noted that the XOR, OR and AND operations on a bitmap are performed very quickly by using the corresponding logical operations on machine octets.

Non-Parametric Classification

Figure 6:
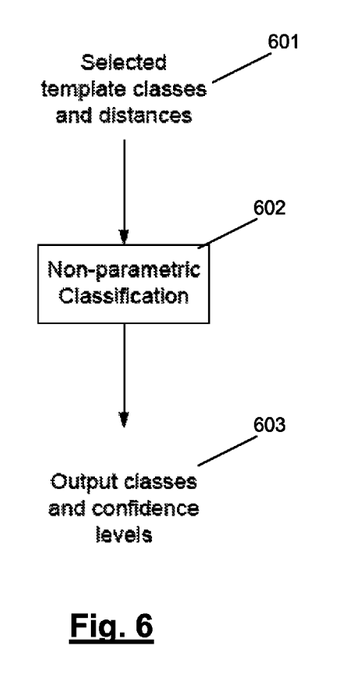
FIG. 6 shows a flowchart of the non-parametric classification which may be used in a character recognition process according to the invention.

The classification is performed by using a non-parametric classification method which gives classes and confidence levels, see FIG. 6. The input 601 is the selected classes and distances obtained by the process of FIG. 5. This is subjected to a non-parametric classification step 602 and the resulting output 603 is identified classes and confidence levels.

Parametric modeling of probability density functions assumes that the forms of the probability density functions are known. Such knowledge typically comes from either a scientific analysis of the physical process or from empirical analysis of the observed data, e.g. a Gaussian distribution. Then what remains, in statistical inference, is to estimate the parameters associated with the probability density function.

The more sophisticated non-parametric density-estimation that is used according to the invention comprises techniques that do not make any assumptions about the forms of the probability density functions—except the mild assumption that probability density functions are smooth functions—and can represent arbitrary probability density functions given sufficient samples. One such technique is the Parzen-window density estimation. Other possible techniques are K-nearest Neighbor (KNN), Probabilistic Neural Network or radial basis function (RBF).

Non-parametric classification is generally slower than parametric classification, but the speed is improved in this preferred embodiment by using prioritization of possible classes, e.g. by giving frequently used character fonts a higher priority in the classification. Any non-classified or misclassified characters are used for training purposes, I.e. for training the classification process.

For example, the speed may be improved by selecting a limited number of representative templates. The selection of the templates can be done in a training process on a large number of character samples in various fonts. The character samples are ordered from characters belonging to the most frequent font to the less frequent font. A template library is first build with the templates corresponding to the characters of the most frequent fonts. Templates are then added in the library for any non-classified or misclassified characters.

Decision Tree

Decision trees are well known in the art. A decision is made by traversing the tree from the root node to a terminal node. At each non-terminal node of a tree, a local decision is made to select a path to a child node. This local decision is made by examining a selection of features. A decision tree is fast but suffers from loss of accuracy because of the accumulation of local decision errors.

Figure 7A:
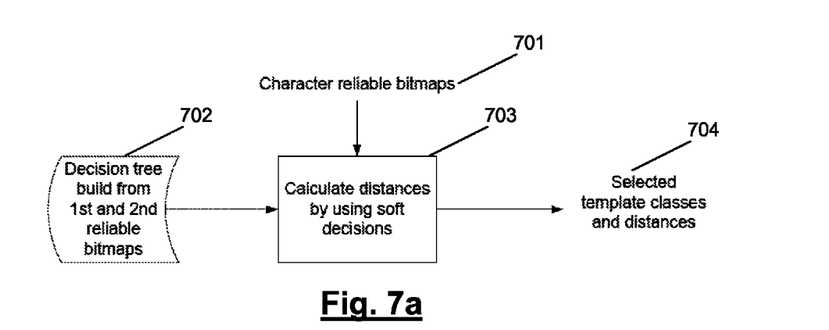
FIG. 7 shows a flowchart of an embodiment of the calculation of the distances between the examined character and the templates by using a decision tree with soft decision.
Figure 7B:
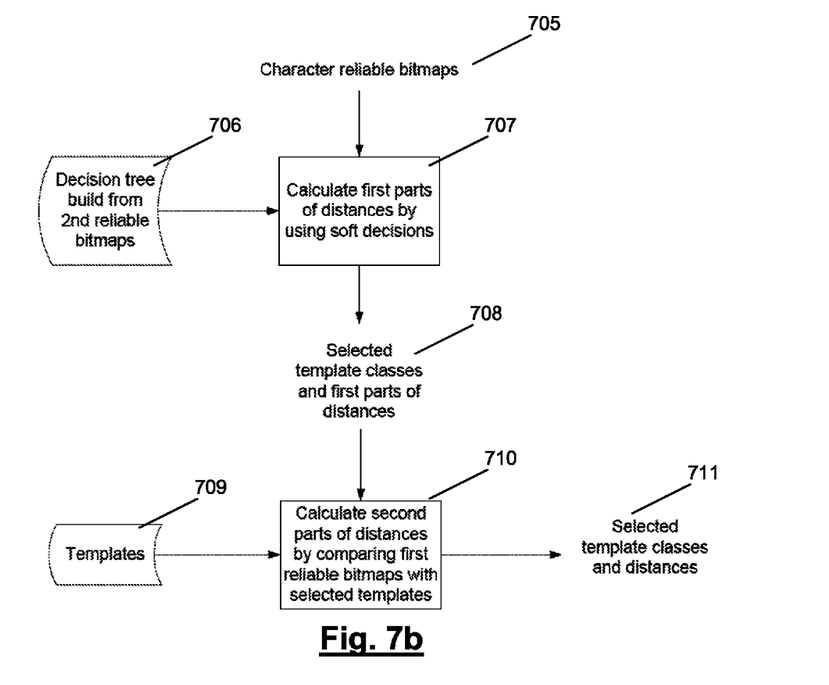
Figure 10:
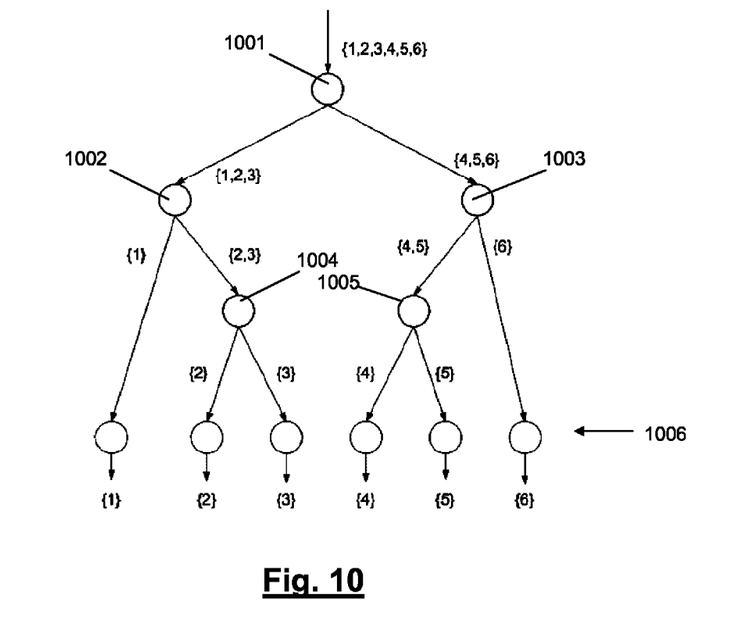
FIG. 10 further illustrates of a binary decision tree.

In preferred embodiments of the invention, examples of which are explained by means of FIGS. 7a-b and 10, a decision tree with "soft" decisions is used to perform steps which combine selecting templates and calculating distances. At each node, a running distance is calculated and all the nodes are visited unless the running distance exceeds a threshold.

In the embodiment of FIG. 7a, character reliable bitmaps are input 701, and subjected in step 703 to a decision tree 702. The step 703 comprises calculating distances by means of soft decisions and outputs selected template classes and distances in step 704. The decision tree, may be a binary decision tree as shown in FIG. 10, i.e. each node 1001, 1002, 1003 has always two child nodes 1002, 1003, 1004, 1005. A terminal node 1006 corresponds to a template.

Figure 11:
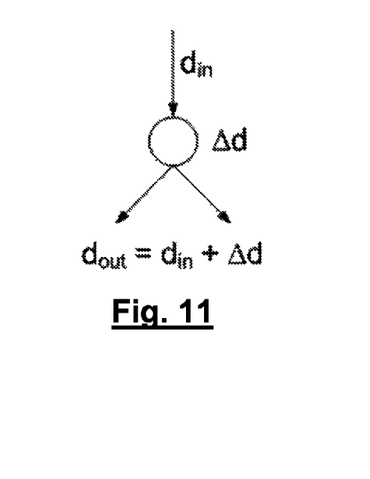
FIG. 11 shows the running distance calculation around a node of the binary decision tree.

Each node 1001-1006 contains a list of reliable black pixels and reliable white pixels. A local distance $d_{out}$ is calculated at each node by comparing the reliable pixels of the examined character with the reliable pixels in the list. The running distance $d_{out}$ of this node is the running distance $d_{in}$ of the parent node incremented by the local distance $\Delta d$, see FIG. 11. At the terminal node 1006, the running distance is the distance between the character and the template and so the decision tree gives the same accuracy than by comparing the reliable bitmaps directly.

When the running distance exceeds a predefined threshold for a node, this node and all its children nodes are discarded.

The value of the threshold is chosen by balancing the expected speed and the expected accuracy.

When a terminal node 1006 is reached, the template's class and the distance are recorded. The classes of the selected templates and the calculated distances are used in the non-parametric classification method that outputs the identified classes along with confidence values. When no terminal nodes are reached, the examined character is rejected as not being a character.

In the embodiment of FIG. 7b, character reliable bitmaps are input 705 and the decision tree 706 examines only pixels belonging to the second reliable bitmaps. The distances calculated in step 707 correspond then to 4×#(R2) and an intermediate result is output 708, comprising selected templates and first parts of distances. In step 710, #(R1) is then calculated by comparing directly the first reliable bitmaps of the examined character and the first reliable bitmaps of the selected template 709 in order to get the total distance, outputted in step 711 along with the selected template classes.

Building of the Decision Tree

In the preferred embodiment, the decision tree is built from the bottom to the top. Terminal nodes are first added. Each terminal node is associated with a template. They form a list of templates. The 2 templates that are the most similar in that list are selected and a node is added. Its children are the nodes corresponding to the selected templates. A new template is built and associated to the new node: its reliable bitmaps contain the reliable pixels which are common to the 2 templates. Each of the 2 children nodes receives a list of reliable pixels only found in its template.

The templates corresponding to the 2 children nodes are removed from the template list and the new template is added. The templates are examined again to select the 2 templates that are the most similar and another node is added in the same manner. Nodes are added until the list of templates is empty and the decision tree is than completed. The templates may then be removed from the tree.

Further Embodiments

Embodiments according to the invention are processes, algorithms and software code for performing the steps as described herein, storage media on which such processes, algorithms and software code is stored and devices and systems for executing such processes, algorithms and software code.

Embodiments according to the invention may comprise provisions, e.g. software code fragments, for combining the digital input image containing one or more input patterns with the corresponding digital text information obtained from the recognition and storing all in a combined file. The combined file is preferably compressed in such a way that different parts or layers of the file or image are compressed with different compression algorithms, optimized towards the respective part or layer. Preferably a hyper-compression algorithm is used. Examples of such high compression method are e.g. disclosed in the U.S. Pat. No. 5,778,092(A) and US 2008273807 (A1) which are both hereby incorporated by reference herein in their entirety. Both algorithms use a low resolution foreground and a low resolution background plane, and a high resolution binary plane in order to achieve the required compression as well as high resolution for the text. Therefore in an embodiment of the system of the present invention, the system software code also comprises code fragments for compressing the image resulting from the combination of the graphical input image and the recognized text by using a high compression method that segments the image into bi-tonal data and color data and compress those data separately with a compression method adapted to the data type. The high compression method could follow the MRC (Mixed Raster Content) model, object of the ITU-T recommendation T.44.

By means of measures taken as described herein, the invention can take the form of an application for execution on a mobile terminal or a mobile terminal executing such application. The mobile terminal may operate on a standard Microsoft® Windows® operation system, such as Microsoft® Windows XP®, or Windows 7®, but other operating systems may also be used, such as e.g. IOS, Android, Blackberry OS, Windows Phone 7, HP's webOS, or other.

The steps mentioned herein may be applied as stand-alone programs, or may be incorporated or embedded in driver software, or may be provided as plug-ins for cooperating with existing software applications, but may also be provided in other ways known to the person skilled in the art.

The steps mentioned herein may also be performed in a distributed manner on different devices, for example with some steps being performed on a mobile terminal and other steps being performed on an external server, by using for example a SaaS (Software as a Service) delivery model.

The invention claimed is:

1. A pattern recognition process, comprising the steps of, starting from an input pattern:
   a) normalization of the input pattern into a normalized pattern of predetermined size;
   b) generation of a reliable pattern from the normalized pattern by using at least one morphological operator;
   c) calculation of a distance between the reliable pattern and selected templates which are selected from a template library by means of a decision tree, wherein each template belongs to a class;
   d) said decision tree comprising a plurality of nodes leading to a plurality of terminal nodes, each node containing a list of reliable black pixels and reliable white pixels and each terminal node forming one of said selected templates;
   e) said distance calculation comprising calculating a local distance at each node by comparing reliable pixels of said reliable pattern with said reliable black and white pixels in said list; and incrementing at each node a running distance by the local distance, such that the running distance at the terminal node is said distance between the reliable pattern and the selected template; and
   f) classification of the reliable pattern into at least one of the classes of the selected templates by means of at least one non-parametric classification method, which uses said classes of the selected templates and said calculated distances as inputs and outputs identified classes along with confidence levels.

2. A pattern recognition process as in claim 1, wherein the normalization comprises changing the thickness of character strokes of the input pattern.

3. A pattern recognition process as in claim 2, wherein changing the thickness comprises increasing the thickness for thin character strokes and decreasing the thickness for thick character strokes.

4. A pattern recognition process as in claim 1, wherein one of said at least one morphological operator is erosion.

5. A pattern recognition process as in claim 4, wherein by said erosion a first reliable pattern is generated and wherein a second reliable pattern is generated by erosion of the first reliable pattern.

6. A pattern recognition process as in claim 4, wherein said erosion is performed by using logical operations on machine octets.

7. A pattern recognition process as in claim 1, wherein one of said at least one morphological operator is dilation.

8. A pattern recognition process as in claim 1, wherein said selection of templates from the template library is performed by a template matching process.

9. A pattern recognition process as in claim 1, wherein the nodes at which said running distance exceeds a predetermined threshold are discarded.

10. A pattern recognition process as in claim 1, wherein said selection of templates from the template library is performed by means of a decision tree followed by a template matching process.

11. A pattern recognition process as in claim 1, wherein said at least one non-parametric classification method is chosen from the group consisting of: Parzen-window density estimation, K-nearest neighbor, probabilistic neural network, radial basis function.

12. A pattern recognition process as in claim 1, wherein said classification comprises prioritization of a predetermined set of templates among all possible templates.

13. A pattern recognition process as in claim 12, wherein said prioritization comprises giving templates corresponding to frequently used character fonts a higher priority.

14. A computer program product stored on a non-transitory computer usable medium and directly loadable into a memory of a computer, comprising software code portions for performing the steps of, starting from an input pattern:
   a) normalization of the input pattern into a normalized pattern of predetermined size;
   b) generation of a reliable pattern from the normalized pattern by using at least one morphological operator;
   c) calculation of a distance between the reliable pattern and selected templates which are selected from a template library, wherein each template belongs to a class, said template being selected by means of a decision tree;
   d) said decision tree comprising a plurality of nodes leading to a plurality of terminal nodes, each node containing a list of reliable black pixels and reliable white pixels and each terminal node forming one of said selected templates;
   e) said distance calculation comprises:
      calculating a local distance at each node by comparing reliable pixels of said reliable pattern with said reliable black and white pixels in said list;
      incrementing at each node a running distance by the local distance, such that the running distance at the terminal node is said distance between the reliable pattern and the selected template; and
      wherein said selection of templates comprises discarding the nodes at which said running distance exceeds a predetermined threshold,
   f) classification of the reliable pattern into at least one of the classes of the selected templates by means of at least one non-parametric classification method, which uses said classes of the selected templates and said calculated distances as inputs and outputs identified classes along with confidence levels.

15. A computer program product as in claim 14, wherein the normalization comprises changing the thickness of character strokes of the input pattern, wherein changing the thickness comprises increasing the thickness for thin character strokes and decreasing the thickness for thick character strokes.

16. A computer program product as in claim 14, wherein one of said at least one morphological operator is erosion by which a first reliable pattern is generated, and wherein a second reliable pattern is generated by erosion of the first reliable pattern.

17. A computer program product as in claim 16, wherein said erosion is performed by using logical operations on machine octets.

18. A computer program product as in claim 14, wherein said at least one non-parametric classification method is chosen from the group consisting of: Parzen-window density estimation, K-nearest neighbor, probabilistic neural network, radial basis function.

19. A computer program product as in claim 14, wherein said classification comprises prioritization of a predetermined set of templates among all possible templates, wherein said prioritization comprises giving templates corresponding to frequently used character fonts a higher priority.

20. A mobile terminal having a pattern recognition process, executable on said mobile terminal and comprising software code portions for performing the steps of, starting from an input pattern:
 a) normalization of the input pattern into a normalized pattern of predetermined size;
 b) generation of a reliable pattern from the normalized pattern by using at least one morphological operator;
 c) calculation of a distance between the reliable pattern and selected templates which are selected from a template library, wherein each template belongs to a class, said selection being performed by means of a decision tree;
 wherein said decision tree comprises a plurality of nodes leading to a plurality of terminal nodes, each node containing a list of reliable black pixels and reliable white pixels and each terminal node forming one of said selected templates;
 wherein said distance calculation comprises:
  calculating a local distance at each node by comparing reliable pixels of said reliable pattern with said reliable black and white pixels in said list;
  incrementing at each node a running distance by the local distance, such that the running distance at the terminal node is said distance between the reliable pattern and the selected template;
 and wherein said selection of templates comprises discarding the nodes at which said running distance exceeds a predetermined threshold, and
 d) classification of the reliable pattern into at least one of the classes of the selected templates by means of at least one non-parametric classification method, which uses said classes of the selected templates and said calculated distances as inputs and outputs identified classes along with confidence levels.

21. A mobile terminal according to claim 20, wherein the mobile terminal is a smartphone.

22. A mobile terminal according to claim 20, wherein the mobile terminal is a tablet PC.

* * * * *